Patented June 25, 1935

2,006,207

UNITED STATES PATENT OFFICE 2,006,207

OIL-SOLUBLE SYNTHETIC RESIN AND PROCESS FOR ITS MANUFACTURE

Madhav R. Bhagwat, Elizabeth, N. J., assignor to Combustion Utilities Corporation, New York, N. Y., a corporation of Maine No Drawing. Application January 25, 1930, Serial No. 423,556

4 Claims. (Cl. 260—4)

This invention relates to the production of varnish and lacquer compositions containing synthetic resins and it further relates to oil-soluble resinous condensation products of the phenol formaldehyde type and methods for producing the same.

The preparation of resins of the phenol formaldehyde type from the lower boiling phenols and formaldehyde and the higher aldehydes is already known. Such processes yield a product which in many cases is of the potentially reactive type adapted to be converted to the infusible, insoluble form on a heat treatment. These resins are not soluble in the usual drying oils and hydrocarbon oils normally employed in varnish compositions so that in order to make the resins compatible with such vehicles it has been essential to use some form of mutual solvent for the resins and for the drying oils in order to obtain a homogeneous varnish. Such mutual solvents are often undesirable and prevent a proper utilization of the varnish for certain purposes.

Processes are also known for the preparation of synthetic resins by the treatment of low temperature tar acids with higher aldehydes above formaldehyde in amounts less than the theoretical equivalent of the said tar acids whereby oil-soluble resins have been obtained. In such instances it is necessary to employ acid catalysts in order to permit the formation of the saliretin type of resin. Obviously, a substantial amount of the tar acids is left unreacted, due to the insufficiency of aldehyde, and these tar acids are lost by volatilization from the reaction mixture during the subsequent thickening treatment of the resin. The result is of course a product of variable characeristics.

In view of the rapid recent development of methods for producing formaldehyde by the partial oxidation of hydrocarbons, this aldehyde is available in much larger quantities than formerly. It is highly desirable to find a suitable method whereby it may be utilized to produce synthetic resins of a character adapting them as substitutes for the expensive natural resins or varnish gums now in wide use in varnish making.

The present invention is based in part upon the discovery that synthetic resins of a type eminently suited as natural resin substitutes for varnish making can be prepared from higher tar acids and particularly those obtained from tar produced by low temperature carbonization methods if such tar acid mixtures or various fractions of such tar distillates containing the tar acids in solution are treated under certain conditions with formaldehyde containing suitable proportions of higher aldehydes, such as acetaldehyde, benzaldehyde and the like, either with or without a catalyst for the condensation reaction. Both basic and acid catalysts are suitable. The further discovery has been made that synthetic resins of this type may be produced from the tar acids and the higher aldehydes alone even in the presence of a basic catalyst such as sodium hydroxide which normally tends to catalyze the reaction producing synthetic resins of the potentially reactive type.

The present invention is based in part upon the additional discovery that it is possible to use as the aldehyde containing substance the crude liquid reaction mixtures containing aldehydes and methanol produced by the various processes for the partial oxidation of liquid or gaseous hydrocarbons. The condensation reaction may be so conducted as to produce by the use of these materials valuable synthetic resins of the oil-soluble type, while concurrently recovering in a purified form the alcohol content of the said reaction mixture.

Among the more important objects of the present invention therefore are to produce by means of a mixture of formaldehyde and one or more higher aldehydes a synthetic resin substitute for natural resins in varnish making; in an improved manner to produce oil soluble resins from high boiling tar acids; and to produce from a hydrocarbon partial oxidation reaction mixture a valuable oil-soluble resin while concurrently refining the said reaction mixture in a manner to recover a purified alcohol substantially free of aldehydes, esters and acids.

The invention in its broadest sense involves the treatment of a hydrocarbon oil containing tar acids, or a mixture of tar acids either in the free state or combined with alkali to form a phenolate solution thereof, with an aldehyde mixture containing higher aldehydes with or without a substantial amount of formaldehyde and with or without a suitable catalyst. The aldehyde may be present in the mixture employed in amounts less than, equivalent to, or more than the molecular proportions with respect to the tar acids present in the material being treated, and such treatment when carried out in accordance with the present invention as hereinafter more specifically disclosed will yield a synthetic resin or varnish gum which is soluble in varnish oils such as linseed oil, China-wood oil and the like, as well as in hydrocarbon oils and molten waxes. According to a preferred modification of the invention either a crude or a refined liquid reaction mixture obtained by any of the well known processes involving the partial oxidation of liquid or gaseous hydrocarbons, or by other known methods for the synthesis of higher aldehydes may be employed as the source of the aldehyde containing substance employed. An example of such a liquid reaction mixture is the mixture of aldehydes and methanol produced by the well-known process of treating natural gas and the like with air or oxygen under superatmospheric pressure and at temperatures below 500° C., the reaction normally occurring in the gas phase either in the presence of catalysts such as platinum or nickel or in their absence. An example of such reaction mixture contained formaldehyde and acetaldehyde in the relative proportions of 2¼:1, and materially larger amounts of alcohols such as methyl alcohol, together with certain acid substances giving the reaction mixture a definite acid reaction. The relative proportions of these substances present will vary widely in accordance with the conditions under which the partial oxidation of the hydrocarbon is effected; but the reaction mixtures will essentially contain these mixed aldehydes with or without substantial amounts of methanol and other alcohols and organic compounds.

In carrying out the essential steps of the invention, the higher tar acids, such as those obtained from tar distillates and preferably those having a boiling range above 225° C.,—or alkaline phenolate solutions of these tar acids, or the tar distillates themselves, are treated with suitable aldehyde mixtures containing formaldehyde and one or more aldehydes of higher molecular weight, either in the presence or absence of a basic catalyst, at temperatures near the boiling point of the mixture for a length of time generally ranging from one half hour and upward but sufficient to permit the condensation reaction to occur and to facilitate the formation of the resinous condensation products. After the reaction is completed the excess water and volatilizable impurities are boiled off and the resin thickened in this maner to the desired degree whereupon it is cooled and solidifies to form the desired resin.

Where a phenolate solution of the higher molecular weight tar acids is employed the precipitation of the resin after its formation is facilitated by the dilution of the reaction mixture with cold water followed by its acidification whereupon the resin is precipitated from the solution in form suitable for washing free from impurities and is thereafter dried.

While amounts of aldehydes somewhat less than the theoretical equivalent of the tar acids present yield an oil soluble resin, it has been found desirable to utilize an amount of aldehyde slightly in excess of this equivalent, (for instance 1.1 mol HCHO per mol tar acids) in order to insure the complete utilization of the tar acids present and the manufacture of a uniform product.

In instances where a tar distillate is employed as the source of the higher tar acids, it is generally preferable to precipitate the synthetic resin from the reaction mixture after the condensation by the addition thereto either of a solvent such as petroleum ether, in which the hydrocarbon oil component of the distillate is soluble and in which the resin is substantially insoluble,—or a dilute acid such as sulfuric or hydrochloric acid may be added to assist in precipitating the resin from the emulsified reaction mixture containing a substantial amount of the resin in colloidal suspension. In instances where a hydrocarbon partial oxidation reaction mixture containing aldehyde mixtures and methanol are employed it is preferable to treat the tar-acid-containing material with such reaction mixture in suitable proportions to give a ratio of tar acids to total aldehydes of not more than equi-molecular proportions or to provide an excess of the total aldehydes.

The following examples show adaptions of the present invention to the treatment of a variety of tar acid bearing materials. These are given merely for the purpose of illustration and they are not to be construed as in any way limiting the invention beyond the scope thereof set out in the appended claims.

*Example 1.*—150 grams of the high molecular weight tar acids extracted in the usual manner from a low temperature tar distillate having a boiling range up to 300° C. were mixed with 92 grams of U. S. P. formalin and 3.2 grams of C. P. acetaldehyde. To this mixture of tar acids and aldehydes was added 22 cc. of a normal sodium hydroxide solution and the mixture was boiled for one hour under a reflux condenser. The condenser was thereafter removed and the heating continued to evaporate the water and thicken the resin. The product obtained was soluble in linseed oil and in other drying oils and solvents, such as benzol, carbon tetrachlorid and the like.

The relative proportions of the higher aldehydes to formaldehyde may be varied within rather wide limits. Although aldehyde mixtures containing ratios of acetaldehyde to formaldehyde of 1:10 are particularly suitable, similar mixtures having ratios of acetaldehyde to formaldehyde of 1:30 give satisfactory products. Others of the higher aldehydes such as heptaldehyde, crotonaldehyde, benzaldehyde, furfural and the like may be substituted for the acetaldehyde in the above example. Furthermore other catalysts such as hydrochloric acid may be substituted for the sodium hydroxide, or the catalyst may be dispensed with.

*Example 2.*—200 cc. of tar acids extracted from a low temperature tar distillate having a boiling range up to 300° C. was treated with 200 cc. of a crude hydrocarbon partial oxidation reaction mixture containing acetaldehyde, formaldehyde and methyl alcohol in the proportions of 1 to 2¼ to 5.7. 35 cc. of a 4% sodium hydroxide solution was employed as a catalyst. The mixture was refluxed for one hour at the boiling temperature of the mixture, (about 85° C. due to the presence of the methyl alcohol). Following this, refluxing was discontinued and the alcoholic portion of the reaction mixture was distilled off and the resin thickened by heating to about 165° C. Upon cooling the thickened final product a brittle resin was obtained which was soluble in linseed oil, carbon tetrachlorid, acetone, denatured alcohol and benzol, but which was insoluble in petroleum ether and petroleum naptha.

The amount of the crude aldehyde-containing reaction mixture employed may be widely varied without substantially affecting the character of the resin or its solubility in oils and the other substances mentioned. The alcohol distilled over during the distillation in this instance contained small amounts of aldehydes which had not reacted with the tar acids. These may be removed in various ways, as for example by suitable treatment of the liquid or vapors with alkali.

*Example 3.*—An oil-soluble resin was produced by a condensation in the absence of catalysts by treating 150 cc. of tar acids of the type employed in Example 2 with 250 cc. of the crude aldehyde-containing reaction mixture mentioned in Example 2, and the mixture condensed under reflux for two hours at the boiling temperature (85–90° C.). The alcoholic components were then distilled off following which the said refluxing was continued at the higher temperature now possible (97° C.) an hour longer. Refluxing was again discontinued and the product thickened whereupon, on cooling, brittle resins of the desired type were obtained in large yield.

In place of employing the crude hydrocarbon partial oxidation reaction mixture, which is definitely acidic in reaction and which contains substantial amounts of soluble metal salts, this crude mixture may be suitably treated to remove the iron salts prior to its utilization in accordance with the present invention. Furthermore, this crude reaction mixture may be neutralized with an alkali such as sodium hydroxide, filtered, and the clear liquor, which may be faintly alkaline, employed in the condensation reaction. Resins produced by this neutralized and purified aldehyde-containing mixture are generally of exceptionally bright color and have all the desirable properties of oil solubility previously described.

Example 4.—Similar results to the above have been obtained by a treatment of the mixtures of tar acids from the total distillate obtained from a low temperature tar by distillation to a hard pitch. Such a mixture therefore contains very high-boiling tar acids, many of which are not normally found in the 300° C. distillate previously mentioned. 150 grams of the tar acids extracted from this total distillate were reacted with 250 cc. of the crude aldehyde-containing mixture mentioned in Example 2, in the presence of 15 cc. of normal sodium hydroxide. Refluxing was continued for one hour and a half at the boiling temperature, around 85° C., following which the water and alcohols were distilled away and the resins thickened. The latter were soluble in drying oils such as linseed oil, China-wood oil, and in carbon tetrachlorid, acetone, benzol and the like. The alcohol content of the reaction mixture was recovered as a distillate.

It is possible to top this hydrocarbon partial oxidation reaction mixture either in the crude or purified form by distillation whereby the alcohol and substantially all the acetaldehyde may be removed therefrom. The residual liquor containing the formaldehyde may then be fortified with acetaldehyde, and the resultant mixture employed in the present process.

Under some conditions it is desirable to employ an alkaline phenolate solution of the higher tar acids rather than to utilize the extracted tar acids per se. Such a case may arise where a hydrocarbon liquid partial oxidation reaction mixture containing methanol is employed for the condensation. In such instance the alkaline conditions under which the reaction takes place permits the neutralization of the acidity of the aldehyde-containing mixture, and it makes possible the removal by distillation from the final reaction mixture of methyl alcohol substantially free from acetaldehyde which is normally difficult to separate from the alcohol. An example of such process is here given.

Example 5.—2000 cc. of a phenolate solution of tar acids (prepared with NaOH from a low temperature tar distillate having a boiling range up to 300° C. and containing per 100 cc. of the phenolate solution, 37.7 grams of tar acids of av. mol. wt.=129) was mixed with 1380 cc. of the crude partial oxidation reaction mixture employed in Example 2 so that there was about 1.1 mol. of CHOH for each mol. of tar acid present. The mixture was brought up to its boiling point (about 89° C.) in a steam jacketed vessel with agitator, ten minutes being required for this operation which was performed under a reflux condenser. The alcoholic components of the reaction mixture were then distilled off until the temperature of the residual liquid in the kettle reached 100° C., this operation requiring 1½ hours. The hot agitated reaction mixture remaining in the kettle was then made faintly acid by means of a 30% aqueous solution of $H_2SO_4$. The resinous condensation produced separated and at this temperature formed the upper layer. The lower layer of aqueous sulfate solution was drawn off, and hot water was added to the resin in the kettle. Agitation of the mixture served to wash the resin free from water-soluble impurities, and the resin—now forming the lower layer—was drawn off, dehydrated, and thickened by heating to approximately 165° C. in an open vessel at atmospheric pressure. The resin thus treated was a brittle solid at room temperature and was of the oil-soluble type. The alcohol thus recovered in this process from the crude hydrocarbon oxidation reaction mixture contained less than ⅓% of total aldehydes. The excess alkali in the reaction mixture obviously acted to convert any excess formaldehyde present in the reaction mixture to alkaline formate, in accordance with the well-known Cannizzaro reaction. These valuable water-soluble by-products are obtainable from the mixture after the removal of the resin and may if desired be purified by any of the well known processes. Any excess of the higher aldehydes such as acetaldehyde are resinified by the alkali.

Example 6.—In order to prepare in powdered form this oil-soluble resin a modification of the treatment of the phenolate solution is necessary. For example, 400 cc. of an alkaline phenolate solution (38 grm. tar-acids av. m. w. 129 per 100 cc. phenolate solution) was treated with 200 cc. of a crude partial oxidation reaction mixture containing 6.2% acetaldehyde by weight, 20.9% formaldehyde by weight, and 20.6% methanol by weight. This mixture was heated to the boiling point under a reflux condenser, and then distillation of the methanol was started, being continued until the temperature of the reaction mixture reached 110° C. The time required for this operation was two hours, and the total volume of distillate was 330 cc. The heating of the reaction mixture was continued at 110° C. under a reflux condenser for another hour. The reaction mixture was then diluted with about four times its volume of cold water, and 20% $H_2SO_4$ was added until the diluted mixture was slightly acid. The resin then precipitated in a granular form and could be filtered off. The precipitate on the filter was washed with water and dried at room temperature. This resin was of the oil-soluble type described above.

In instances where tar distillates are employed directly in the condensation, an additional treatment of the mixture either previous to or subsequent to the actual condensation reaction is essential. In order that the resins produced may be suitably separated from the hydrocarbon oil present and in which they are normally soluble at the elevated temperature at which the condensation reaction occurs, the tar distillate may have directly added to it certain oil solvents such as petroleum hydrocarbons like petroleum naptha in which the condensation products are insoluble,—or the said petroleum hydrocarbon or other suitable solvent may be added later in the process. For example, 300 cc. of a low temperature tar distillate containing 31.5 grams of tar acids, (average molecular weight 129) per 100 cc. was reacted with 200 cc. of the crude aldehyde-containing mixture referred to in Example 2 in the presence of 15 cc. of normal NaOH. This mixture was refluxed for two hours at the boiling temperature around 90° C., following which the methanol and portions of the water were distilled away and the resin somewhat thickened to the form of an emulsion. The resins were removed thereafter from the said emulsion by shaking the latter with an equal amount of petroleum ether. The same results were obtained by substituting for the petroleum ether a small amount (a few percent) of dilute sulfuric acid. The resins obtained were of the oil-soluble type suitable for use in varnish making.

The oil-soluble resinous condensation products prepared in accordance with the invention are readily soluble in drying oils such as raw and treated linseed oil, China-wood oil and the like. The melting point of the resins makes them particularly suitable as a substitute for the ordinary varnish gums or resins which are now in wide use and which are relatively expensive. By dissolving the resins of the present invention in heated drying oils, with or without the presence of other materials capable of modifying the properties of the varnishes thus formed, such as for example, thinners, plasticizers, dryers and the like,—varnishes may be prepared which are suitable for use either as baking enamels,—which require raised temperatures in the neighborhood of 200° C. for completing the cure thereof,—or which are adapted for drying and curing at normal temperatures. For example, plasticizers such as pine oil, castor oil, and naphthalene and the chloro derivatives thereof, may be dissolved in the resin, where enamel or lacquer compositions are desired which are adapted to be cured by a heat treatment. The resin of the present invention may if desired be treated with a hardening agent of well known type such as hexamethylene-tetramine.

Varnish films prepared from solutions of these oil-soluble resins in drying oil such as linseed oil, are relatively stable to heat; they are insoluble in all organic solvents after a relatively short baking treatment; the films are hard but flexible, and strongly adherent to metals, including aluminum. Since the resin is non-acidic, it does not increase the acid number of the varnish or other composition containing it, as that it may be used with basic pigments without causing "livering" and the like.

It is within the purview of the invention to substitute for the crude liquid reaction mixture prepared by a partial oxidation of hydrocarbons,—other crude reaction mixtures containing formaldehyde and the higher aldehydes, such as those obtained by reacting a hydrocarbon with carbon dioxide or carbon monoxide in well known manner.

It is apparent that in carrying out the steps of the present invention it is possible to prepare a valuable resinous condensation product from either crude or refined tar-acid-containing materials by a treatment thereof with crude or refined partial oxidation reaction mixtures containing various amounts of formaldehyde and higher aldehydes in a manner to take advantage of specifically different properties possessed by the different aldehydes in various degrees. Concurrently therewith, the crude hydrocarbon partial oxidation reaction mixture or its equivalent, —containing various mixtures of aldehydes and alcohols,—is subjected to a refining treatment whereby the aldehyde content thereof is utilized commercially, and the alcohol content is segregated in a relatively pure form, well adapted for further refining treatment of any well-known type or for use in the form recovered. The invention opens up to the varnish manufacturer a cheaper source of raw material or synthetic substitute for the expensive natural varnish gums and makes him independent of the foreign producer for his supply of such varnish gums. This has not been true heretofore in instances where oil-soluble resins of the phenol formaldehyde type were produced by employing amounts of these varnish gums or natural resins for the purpose of acting as mutual solvents to render the synthetic resins soluble in drying oils. By the terms "higher tar acids", "high molecular weight tar acids" and similar expressions, where appearing in the claims, it is intended to designate the mixed tar acids having a boiling range above 225° C. derived from either low or high temperature coal tar. Such a mixture of tar acids derived from a low temperature tar distillate having a boiling range up to 300° C. has an average molecular weight of around 129. The invention is intended to be limited only within the scope of the appended claims.

I claim:

1. The process comprising reacting a crude oxidation mixture containing formaldehyde, higher aldehydes and methanol which is produced by the partial oxidation of hydrocarbons in the vapor phase at elevated temperatures, in the presence of a basic catalyst, with tar acids having a boiling point in the range of 225° C. to 300° C. and higher obtained from low temperature tar, to effect a condensation reaction of the tar acids with aldehydes to form a resinous oil-soluble condensation product and thereafter distilling the unreacted oxidation products to recover a purified methanol therefrom.

2. The process comprising reacting a crude oxidation mixture containing formaldehyde, higher aldehydes and methanol which is produced by the partial oxidation of hydrocarbons in the vapor phase at elevated temperatures, in the presence of a basic catalyst, with tar acids having a boiling point in the range of 225° C. to 300° C. and higher obtained from low temperature tar, the oxidation mixture and tar acid products being used in substantially the proportions of 1 to 1½ parts by volume of tar acids to 1 to 2½ parts by volume of oxidation mixture and said oxidation mixture containing 2¼ to 30 parts by weight of formaldehyde to 1 part by weight of acetaldehyde, to effect a condensation reaction of the tar acids with aldehydes to form a resinous oil-soluble condensation product and thereafter distilling the unreacted oxidation products to recover a purified methanol therefrom.

3. The process of producing resinous condensation products which are soluble in drying oils which comprises reacting a high boiling acid from low temperature tar having a boiling point range of 225° C. to 300° C. and higher, in the presence of an alkaline catalyst, with at least an equi-molecular amount of an aldehyde mixture containing a major portion of formaldehyde and a minor portion of acetaldehyde, and recovering the resultant oil-soluble resin.

4. The process of producing resinous condensation products which are soluble in drying oils which comprises reacting low temperature tar acids having a boiling point in the range of 225° C. to 300° C. and higher, in the presence of an alkaline catalyst, with at least an equi-molecular amount of an aldehyde mixture containing formaldehyde in the proportion of 2¼ to 30 parts by weight to 1 part by weight of acetaldehyde and recovering the resultant oil-soluble resin.

MADHAV R. BHAGWAT.

CERTIFICATE OF CORRECTION.

Patent No. 2,006,207. June 25, 1935.

MADHAV R. BHAGWAT.

It is hereby certified that error appears in the printed specification of the above numbered patent requiring correction as follows: Page 1, first column, line 15, strike out the word "normally" and insert the same before "not" in line 14; and that the said Letters Patent should be read with this correction therein that the same may conform to the record of the case in the Patent Office.

Signed and sealed this 8th day of October, A. D. 1935.

Leslie Frazer (Seal) Acting Commissioner of Patents.